United States Patent

[11] 3,630,469

[72] Inventor Thomas A. Turgeon
 Minneapolis, Minn.
[21] Appl. No. 31,683
[22] Filed Apr. 24, 1970
[45] Patented Dec. 28, 1971
[73] Assignee Minnesota Mining and Manufacturing
 Company
 Saint Paul, Minn.

[54] WEB TRANSPORT SYSTEM
 11 Claims, 8 Drawing Figs.
[52] U.S. Cl. .................................................. 242/203,
 242/54, 242/67.4
[51] Int. Cl. ................................................ B11b 15/32,
 G03b 1/04
[50] Field of Search.......................................... 242/54, 55,
 200–210, 67.4; 74/321–324, 336, 337; 310/94, 99

[56] References Cited
 UNITED STATES PATENTS
 2,615,641 10/1952 Scott ............................. 242/203
 3,126,161 3/1964 Bemiss et al. ................. 242/203 X
 3,498,571 3/1970 Dilling et al. ................. 242/203

Primary Examiner—Leonard D. Christian
Attorney—Kinney, Alexander, Sell, Steldt & Delahunt ABSTRACT: A drive system for use with a recording web, i.e., tape or microfilm, to move the web past a station, viewing or recording, and for registering with the station a desired portion of the web. The drive system comprises a single-phase induction motor having an axially movable rotor and drive shaft which couples and uncouples with a speed reduction mechanism connected to a drive shaft for a supply reel, and a similar motor and speed reduction mechanism connected to the drive shaft for a takeup reel. The motors are controlled by a three-position switch to energize one motor or the other. When either motor is energized the rotor of that motor couples with the associated speed reduction mechanism to drive the attached reel and to wind the web thereon. Upon deenergization of the motor the rotating rotor with its high angular momentum is uncoupled from the driven speed reduction mechanism causing the drive shaft to stop abruptly due to the frictional retarding forces in both the speed reduction mechanisms. A counter is utilized to determine the position of the web with respect to the station and a drive system connects the takeup reel with the supply reel such that manual adjustment of the takeup reel in either direction affords incremental movement of the web relative to the station along the web path.

Patented Dec. 28, 1971

INVENTOR.
THOMAS A. TURGEON
BY Kinney, Alexander,
Sell, Steldt & DeLaHunt
ATTORNEYS Patented Dec. 28, 1971

INVENTOR.
THOMAS A. TURGEON
BY Kinney, Alexander,
Sell, Steldt & DeLaHunt
ATTORNEYS Patented Dec. 28, 1971

INVENTOR.
THOMAS A. TURGEON
BY Kinney, Alexander,
Sell, Steldt & DeLaHunt
ATTORNEYS

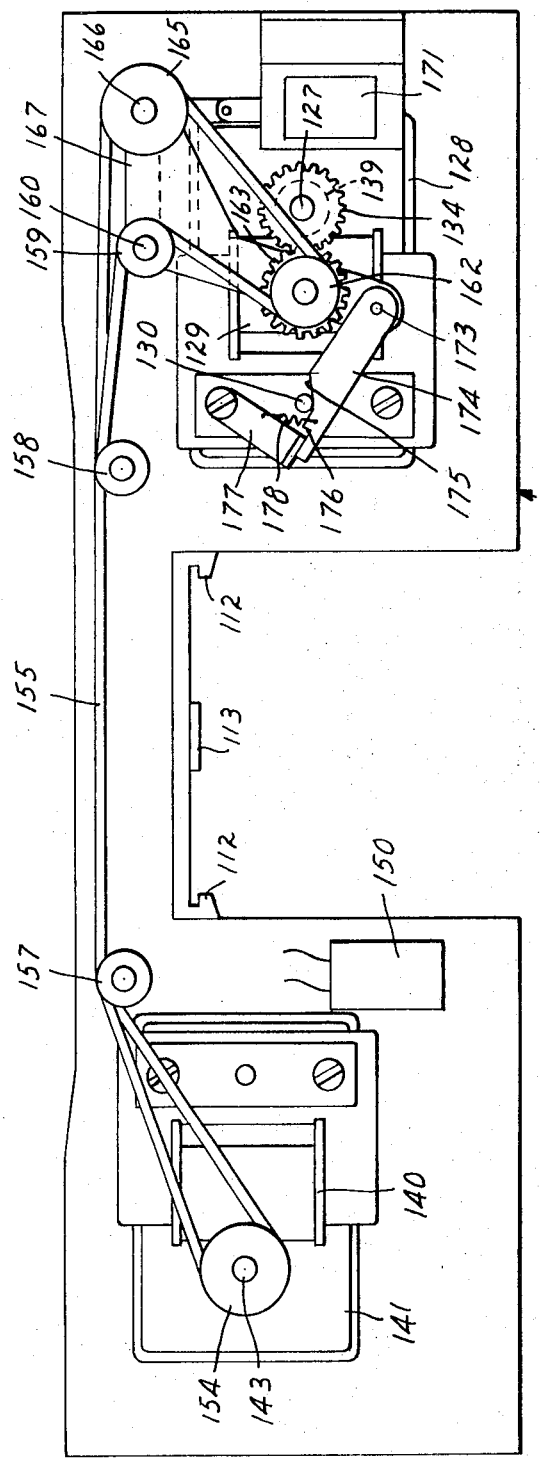

WEB TRANSPORT SYSTEM

The present invention relates to a web transport system and in one aspect to a simplified and inexpensive film drive for use with a microfilm reader and/or reader-printer.

Prior known web transports have utilized universal motors to afford the transport of the web between a supply reel and a takeup reel. These universal motors are generally series connected with a rheostat, which rheostat may be controlled by the operator to control the web speed. Alternatively, the universal motor may be controlled by signals recorded or received from the moving film. These motors and rheostats permit the film to be slowed down as a particular frame or spot on the film approaches or is reached in a searching operation. When the specific frame is reached, the motor is deenergized and a brake is applied to the motor or web drive. Other systems have utilized DC motors with a dynamic brake system whereupon the deenergization of the motor affords the immediate shunting for dynamically braking the motor to stop the web advance. These systems have some overtravel and the motor is then reversed to reach the desired frame.

Other web drives have utilized a single motor and movable idlers which were engageable with the drive shaft to drive the takeup reel or supply reel. Such systems have generally used brakes which are applied against the reel drive shaft or the motor to stop the inertia of the motor rotor and the web drive.

These previously known systems have had various disadvantages, a major one of which was cost. The motor and rheostat, the transformer for conversion of AC current to DC for the DC motors, the switching devices and/or the auxiliary braking devices that have been utilized to control the drive members have been costly, bulky and have added weight. In each of these prior known devices the braking of the angular momentum of the motor rotor or armature to stop the film has caused undue complication. These braking systems have inevitably resulted in some overtravel which was compensated generally by reversing the motor, again adding further cost to the system.

The present invention provides a relatively simple system for transporting a film rapidly along a path past a viewing station or similar area and for registering a predetermined section of the film with that station. The invention utilizes one drive system for a supply reel and a separate drive system for a takeup reel both of which include a speed reduction mechanism and afford the rapid movement of the film in either direction relative to the viewing station, by coupling an energized motor only to the speed reduction mechanism associated with the reel upon which the film is being wound. When a predetermined portion of the film desired by the operator reaches the station he deenergizes the motor which uncouples from the speed reduction mechanism and the film is stopped to retain the selected portion at the station. Location of the desired portion by the operator may be accomplished by a frame counter or footage meter and when the number desired appears at the station, the motor is deenergized. Accuracy of registration is determined in the illustrated embodiment by the reflexes of the operator, but when the motor is deenergized the film will stop. When the motor is deenergized the rotor of the motor uncouples from the speed reduction mechanism. The frictional forces in the speed reduction mechanisms associated with both reels apply a braking torque to the film reels which is greater than the momentum of the drive system and the driven or accumulating reel, and which stops the movement of the film. The frictional forces in the reduction mechanism associated with the drive system for the payoff or supply spool normally apply a retarding or braking torque to prevent spillage of the film from the supply reel and thus supplies a retarding force to the film to maintain the tension therein when the driving forces are discontinued.

The illustrated transport system not only provides for a simpler drive system to each of the supply and takeup reels but through the drive system also affords the simple manual adjustment of the film position operated by imparting a torque to the takeup reel which rewinds the film on the supply or onto the takeup reel as desired.

The improved web transport of the present invention for moving a web along a predetermined path comprises a web drive shaft connected to the web through its coupling to the reel for drawing the same along the path. The web drive shaft is driven through a speed reduction mechanism from an electric motor having an axially movable output shaft on which the rotor and a drive coupling are supported. The drive coupling is movable axially from a first position at which it is not coupled to the web drive shaft to a second position at which it imparts driving torque to the speed reduction mechanism to drive the web drive shaft. The deenergization of the motor promptly disconnects the drive coupling on the motor drive shaft from the speed reduction mechanism so that the angular momentum of the rotor in the motor is removed from the drive system and the frictional forces of the speed reduction mechanism stop the web because this frictional force exceeds the momentum of the speed reduction mechanism, web, and reel. The web supply reel is also retarded by a similar speed reduction mechanism which acts through the web to help brake the system. Manual adjustment of the web is provided by a one-way drive coupling between the takeup reel and the supply reel support shafts.

DESCRIPTION OF THE DRAWINGS

The advantages and novel features will become more apparent upon a careful reading of the following description which refers to the accompanying drawing wherein:

FIG. 8 is an elevational rear view of the web transport of FIG. 6.

Referring now to the drawings there is shown in FIGS. 1, 2, and 3 one embodiment of a web transport attachment formed according to the present invention for use with a microfilm reader and/or reader-printer. As shown in FIG. 1 the microfilm machine would utilize a projection lamp 7, a condensing lens 8, and a projection lens system in a lens barrel 9 to define a viewing station at which it is desired to register a frame section of the web or film to view the image thereon. The image to be viewed would be placed in register with the station by a film gate or aperture 10 defined along the web path of a molded frame 11 of the attachment as illustrated in FIGS. 1 and 2.

Figure 1:
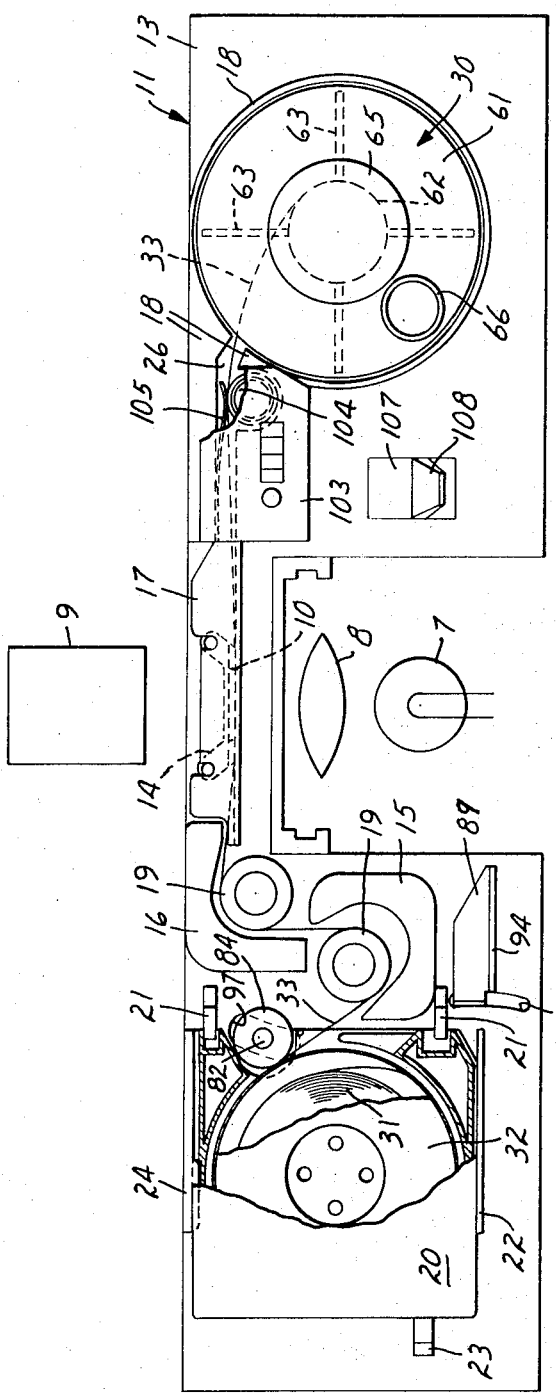
FIG. 1 is an elevational front view of one embodiment of a web transport mechanism constructed in accordance with the present invention.
Figure 2:
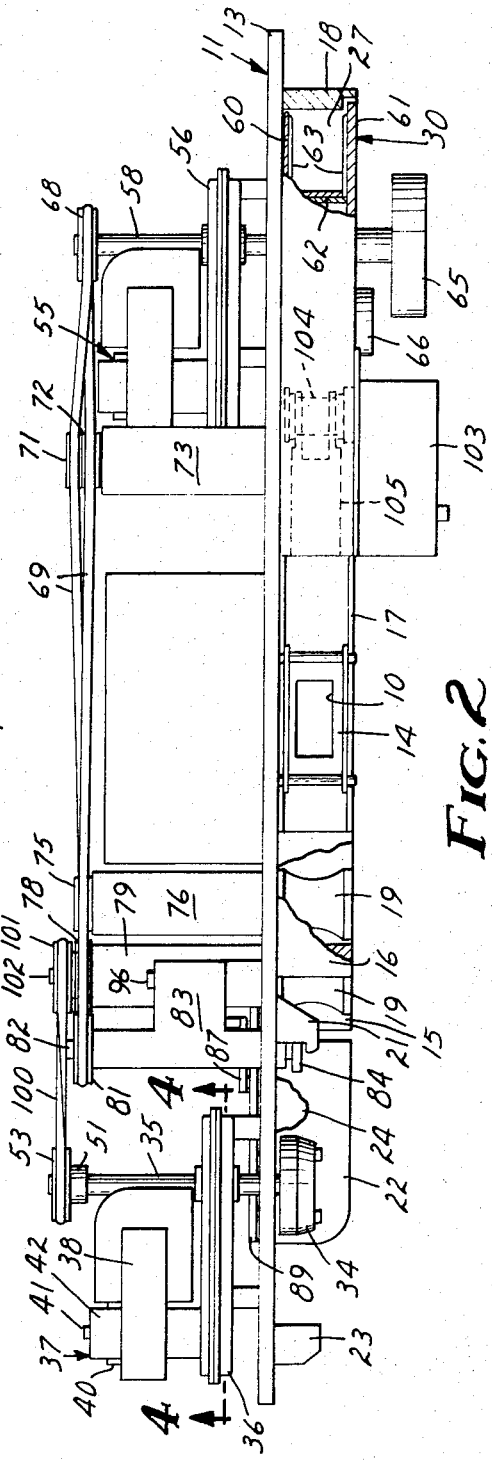
FIG. 2 is a top plan view of the web transport of FIG. 1.

The frame 11 includes a first main support plate 13 on the front or outboard side of which is molded a series of guide members 15, 16, and 18 which, together with a metal guide member 17, define the film path. The plate 13 supports several stub shafts which carry film guide rollers 19 having recessed areas over which the center of the film is positioned to prevent scratching. The rollers 19 aid to define the film path between a support means for a supply reel and a support means for a takeup reel 30. A plate 14 is supported from the film guide 17 by two pins which fit into the film guide 17. The plate 14 aids to maintain the film or web in a planar position on the guide 17 at the viewing station to afford the best exposure of the image.

As illustrated in FIG. 1 the means provided on the frame 11 for receiving and supporting a supply reel accommodates a tape cartridge 20 containing a rotatable film reel 32 having the film 31 fixed thereto and convolutely wound thereon with a leader 33 affixed to the free end of the film. The leader has a wide portion of greater width than the spacing between the flanges on the reel 32. The wide leader 33 is thus wound on the outer peripheral edges of flanges of the reel 32 within a cavity in the cartridge 20. The tape cartridge 20 will supply a film to be viewed to the projection system. The cartridge receiving means includes spaced lugs 21 which locate the cartridge 20 and which fit into recesses on one edge of the cartridge 20, a shelf 22, an abutment 23 and a flexible retaining bar 24 having a lug on its lower surface which engages a recessed area on one side of the cartridge.

Means are provided for driving the leader 33 of the supply of microfilm 31 in the cartridge 20 between the guide members to the takeup reel 30. A roller 84 may be rotated and manually moved into driving contact with the leader 33 wound on the periphery of the supply reel 32 by means later to be explained, thus propelling the leader 33 along the film path into contact with the takeup reel 30.

Means are also provided for driving the supply reel 32 in the cartridge 20 in a direction which will rewind the film 31 and/or leader 33 onto the reel 32 after they have been extended.

Figure 3:
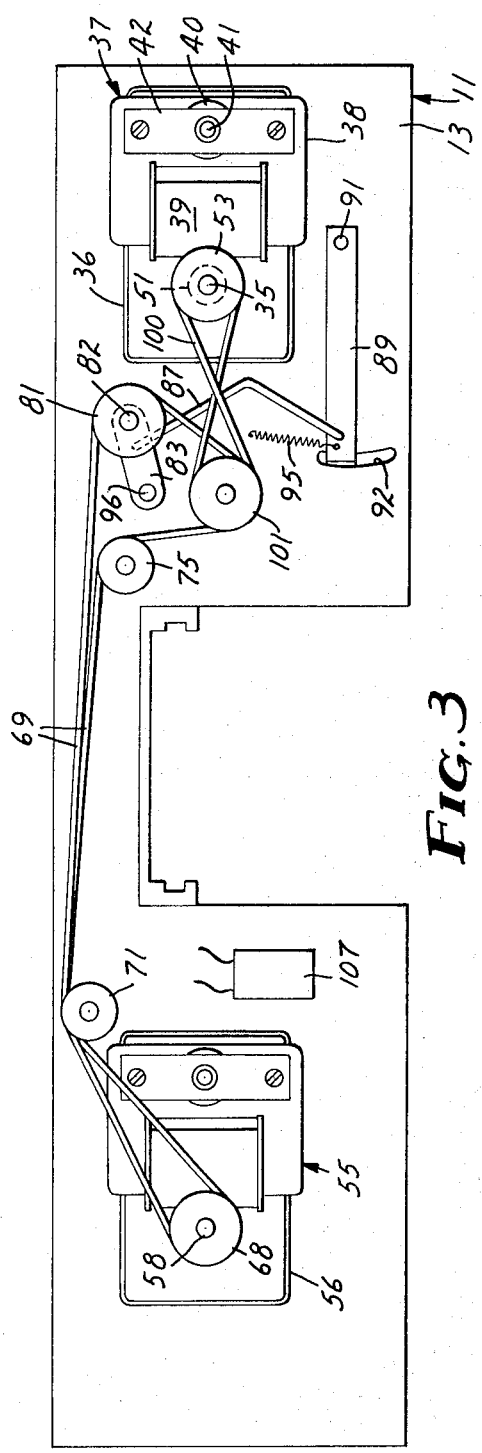
FIG. 3 is an elevational rear view of the web transport of FIG. 1.
Figure 5:
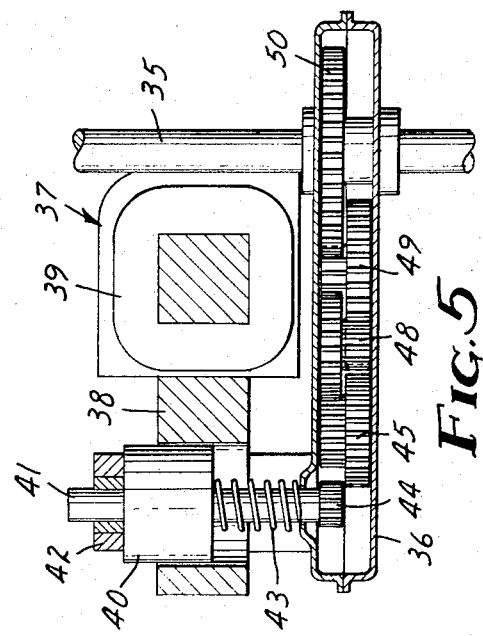
FIG. 5 is a sectional view of the motor and speed reduction mechanism taken along the line 5—5 of FIG. 4.
Figure 4:
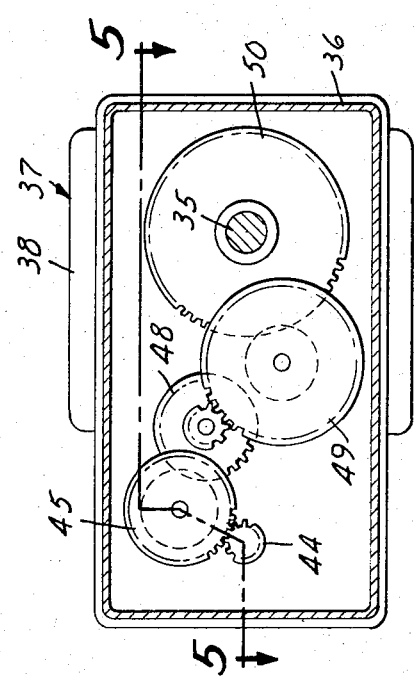
FIG. 4 is a detail sectional view of a speed reduction mechanism taken along the line 4—4 of FIG. 2.

The cartridge 20 when positioned in the cartridge receiving means positions the hub of the rotatable reel 32 on a hub means or hub 34 of a web drive shaft or driven shaft 35. The hub 34 has spring biased axially projecting pins to be received in openings in the reel hub 32. The driven shaft 35 is the output shaft of a speed reducing mechanism or gear box 36. Referring now to FIGS. 3, 4, and 5, an electric drive motor 37 is supported from the gear box 36, which motor 37 is a single-phase induction motor having a core 38, a field winding 39, and a rotor 40. The rotor is secured to an axially movable drive shaft 41 which is rotatably supported in the gear box 36 and in a bridge 42 connecting two support posts for the motor and extending generally parallel with the core 38. When the field winding 39 of the motor 37 is energized, the rotor 40 and shaft 41 are moved axially from a first position shown in FIG. 5 against the bias of a spring 43 to a second or driving position where the rotor 40 is centered in the magnetic core 38. In this second or driving position a nylon spline gear 44 on the end of the shaft 41 which forms half of a drive coupling will engage the teeth on a first spur gear 45 in the gear box 36 which forms the other half of a drive coupling. The spur gear 45, in turn through an attached smaller gear drives a train of double gears 48 and 49 to drive the output spur gear 50 which is secured to the drive output shaft 35.

As is best seen in FIG. 3, on the inboard end of the drive shaft 35 is supported a one-way overrunning clutch 51 which carries a drive pulley 53. Rotation of the pulley 53 will drive the shaft 35 to rotate the reel 32 in a winding direction, but driving the shaft 35 to rotate the reel 32 in a winding direction will not rotate pulley 53. The clutch 51 and pulley 53 are part of a drive coupling between the supply cartridge 20 and the film takeup reel 30 which allows manual winding of the film 31 and leader 33 into the cartridge 20 as will be explained later.

Means are provided for driving the takeup reel 30 in a clockwise direction so that the leader 33 and the film 31 may be wound onto the takeup reel 30, and so that the leader 33 will couple with the takeup reel 30 upon contact with it to wind the leader 33 and film onto the reel 30.

The takeup reel 30 is disposed in a cylindrical cavity 27 in the boxlike guide member 18 which is also formed with a slot 26 leading from the film gate to the cavity 27. The reel 30 is driven by a motor 55 through a speed reducing mechanism or gear box 56, which motor and gear box correspond substantially to the motor 37 and gear box 36. The takeup reel 30 is supported on and attached to a web drive shaft or driven shaft 58 of the gear box 56.

The takeup reel 30 comprises an inner flange 60 and an axially spaced outer flange 61 connected by a hub 62 which is covered with a foam material such as a thin layer of polyurethane. The flange 60 has a slightly smaller diameter than the flange 61 and both flanges fit in the cylindrical cavity 27. The walls defining the cylindrical cavity 27 between the flanges thus serve as a guide to direct the film leader 33 between the reel flanges 60 and 61. The reel 30 is provided with means for coupling the leader to the reel 30 such that it will automatically be taken up and wound onto the reel 30 as the reel is rotated. In the illustrated embodiment the opposed surfaces of the flanges 60 and 61 are formed with radially extending opposed raised ribs 63 which decrease the spacing between the flanges such that they can grasp the sides of the film leader 33 and direct the same inwardly toward the hub 62, since the velocity of a point on the reel flanges 60 and 61 exceeds the linear velocity of the leader 33, and will move the same into engagement with and wrap the leader 33 on the foam covered hub 62.

A manually operated three position switch 107 mounted on the frame 11 is provided, and through an appropriate switching circuit controls the operation of the motors 37 and 55. The switch 107 has a control lever 108 which may be moved upward to activate the motor 55 to rotate the reel 30 in a clockwise direction (as viewed in FIG. 1) or which may be moved downward to rotate the reel 32 in a counter clockwise direction.

The takeup reel 30 is also provided with means for permitting it to be rotated manually. The flange 61 is provided with a projecting knob 65 which may be grasped by the operator and rotated either clockwise or counter clockwise to wind or unwind film from the reel 30, and the flange 61 is provided with an eccentrically positioned projection 66 having a recess therein permitting the operator to insert his index finger in the recess to rotate the takeup reel 30 in the manner of the dial of a telephone.

The manual movement of the takeup reel 30 in an unwinding direction requires that the film be rewound on the supply reel 32 and therefore a drive system between the shaft 58 and the shaft 35 is provided.

At the inboard end of the driven shaft 58 for the takeup reel 30 is fixed a pulley 68. A drive belt 69 is positioned around the pulley 68 and the drive belt 69 affords the torque transmitting or drive system for driving the pulley 53 on the clutch 51 and thereby the shaft 35 and the supply reel 32. The belt 69 is guided over idler pulleys 71 and 72 which are rotatably mounted on a support post 73, an idler pulley 75 mounted on a support post 76, an idler pulley 78 mounted on a support post 79, and around a drive pulley 81 which is attached to a drive shaft 82 rotatably mounted on a support 83 which is pivotable about a shaft 96. The drive coupling between the takeup reel 30 and the supply reel support hub 34 is completed by a belt 100 connecting the pulley 53 with a pulley 101, which pulley 101 is secured to the pulley 78 and rotatable therewith on the shaft 102 supported on the post 79. Thus, when the knob 65 is turned in a direction which will unwind the film 31 or leader 33 from the reel 30, the torque is transmitted via the drive system to rotate the reel 32 to wind on the film or leader, but when the knob 65 is turned in a direction which will wind on the film 31, the clutch 51 will slip so that the winding torque will not be applied to the supply reel 32 through the drive system.

The means for driving the leader 33 to the takeup reel 30 are also driven by the drive belt 69. The shaft 82 extends through an arcuate opening 97 in the plate 13 and carries on its outboard side the drive roller 84 utilized for driving the leader 33 off the flanges of the supply reel 32 and along the film path into engagement with the takeup reel 30 when the takeup reel 30 is being driven by motor 55. The drive roller 84 is movable manually by means of the support 83 into and out of a frictional driving engagement with the leader 33 to thread the film 31. The roller 84 is manually brought into contact with the leader 33 by pivotal movement of a lever 89 attached to the support 83 by an arm 87. The lever 89 is pivotally mounted as at 91 on the plate 13 and has one end portion extending through a slotted arcuate opening 92 to the outboard side of the frame 11. On its outboard side the lever 89 has a flat plate portion 94 engageable by the operator to pivot the lever 89 against the bias of a spring 95. When the operator forces the lever 89 downward, the roller 84 pivots into the cartridge 20 to engage the leader 33. Thus, the leader is driven along the film path to engage the takeup reel 30 in the manner previously described.

In the illustrated embodiment, the rotors of the single phase induction motors 37 and 55 rotate at a speed of about 3,600 r.p.m. and the gear box 36 affords a reduction of 20 to 1 to drive the hub 34 at about 180 r.p.m. The gear box 56 is slightly different from the gear box 36 in that the reduction is about 15 to 1 providing a rotational speed for the shaft 58 of 250 r.p.m. In both the gear boxes 36 and 56 the frictional resistance to rotation of each gear will be amplified in direct proportion to the remaining gear reduction to the output shaft 58 or 35. Thus, the frictional retarding force exerted by the speed reduction gears at the output shaft 58 or 35 will be high, and since the angular momentum of the speed reduction gears is low and the high angular momentum of the rotor in the motor 37 or 55 is removed from the gear train when the motor 37 or 55 is deactivated, the output shaft 35 or 58 with its attached reel 32 or 30 will stop substantially immediately upon such disengagement when the motor 37 or 55 is deenergized.

At a low r.p.m. the frictional resistance to rotation of the shaft 58 with the rotor and drive shaft of the motor 55 disengaged from the gear box 56 is 0.5 inch-ounces (14.42 gram-centimeters). The torque required to rotate the shaft 35 is slightly higher due to the larger reduction in the gear box 36. Thus, the frictional resistance in the gear boxes 56 and 36 affords a retarding force on the shafts 35 and 58 when they are the supply spool supports and provides an instant stop on the film drive reel 30 or 32 when the drive motor 37 or 55 is deenergized and the motor drive spline gear is disengaged from the gear train.

A counter 103 is supported on the frame 11. The counter 103 is driven from a spool 104 which is engageable with the film 31 in the slot 26 of the guide 18. The spool 104 has stepped portions such that the wide leader 33 as it moves through the slot 26 engages portions of the spool 104 having a greater diameter than those engaged by the film 31 as it moves across the spool 104. A spring 105 with bifurcated end portions presses the film against the reduced portions of the spool to guide the film 31 and afford a frictional driving connection between the film 31 and the spool 104. The central portion of the spool 104 is recessed to avoid contact with the film 31 to prevent scratching of the image areas of the film.

The manual three-position switch 107 is supported on the frame 11 with the control lever 108 easily accessible to the operator. The operator can move the lever 108 downward to a position where the switch will energize the motor 55 and drive the takeup reel and the threading roller 84. As he holds the lever 108 he may depress the lever 89 to move the roller 84 into threading position in a cartridge supported on the frame. When the leader is threaded the lever 89 is released. When the counter 103 indicates the frame number or film position desired the switch lever 108 is released. The film stops substantially immediately. If the operator misses the position by a substantial amount the lever 108 is raised to energize motor 37 and rewind the film. If the area desired is missed by only a frame or portion thereof the operator can quickly register the film frame with the aperture by rotation of the reel 30 in one direction or the other. The counter 103, during operation of this attachment, captures the attention and focus of the operator and he does not have to view the annoying blur of the images on the machine viewing screen.

Figure 6:
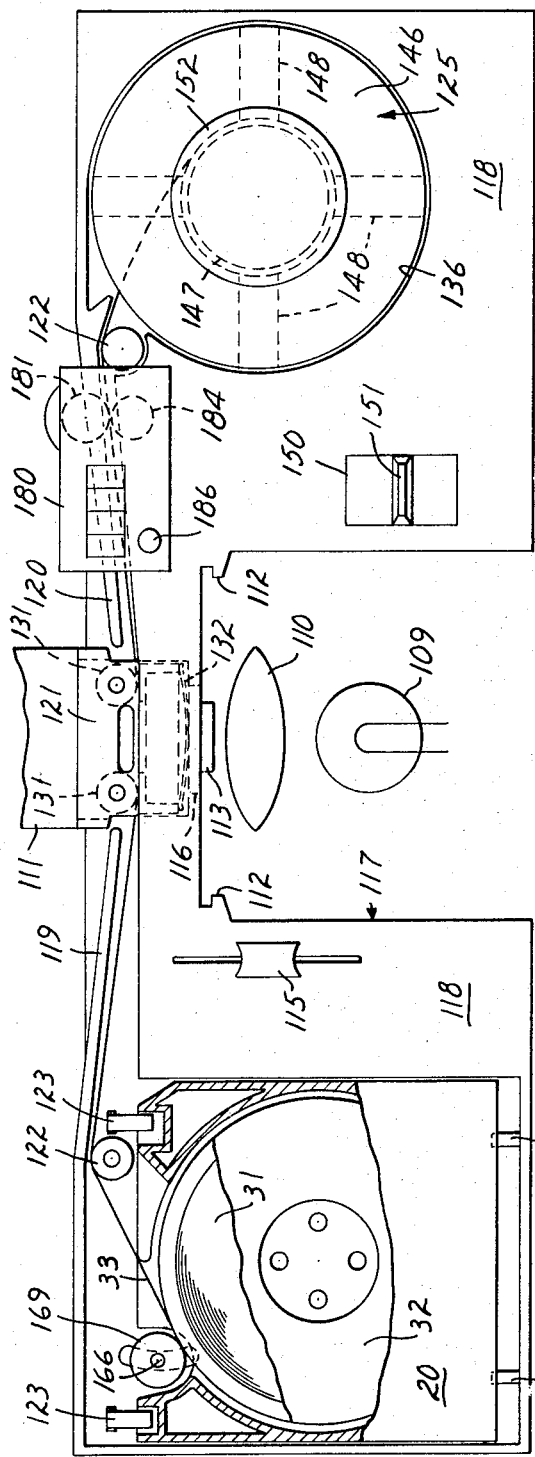
FIG. 6 is an elevational front view of a second embodiment of a web transport mechanism constructed in accordance with the present invention.
Figure 7:
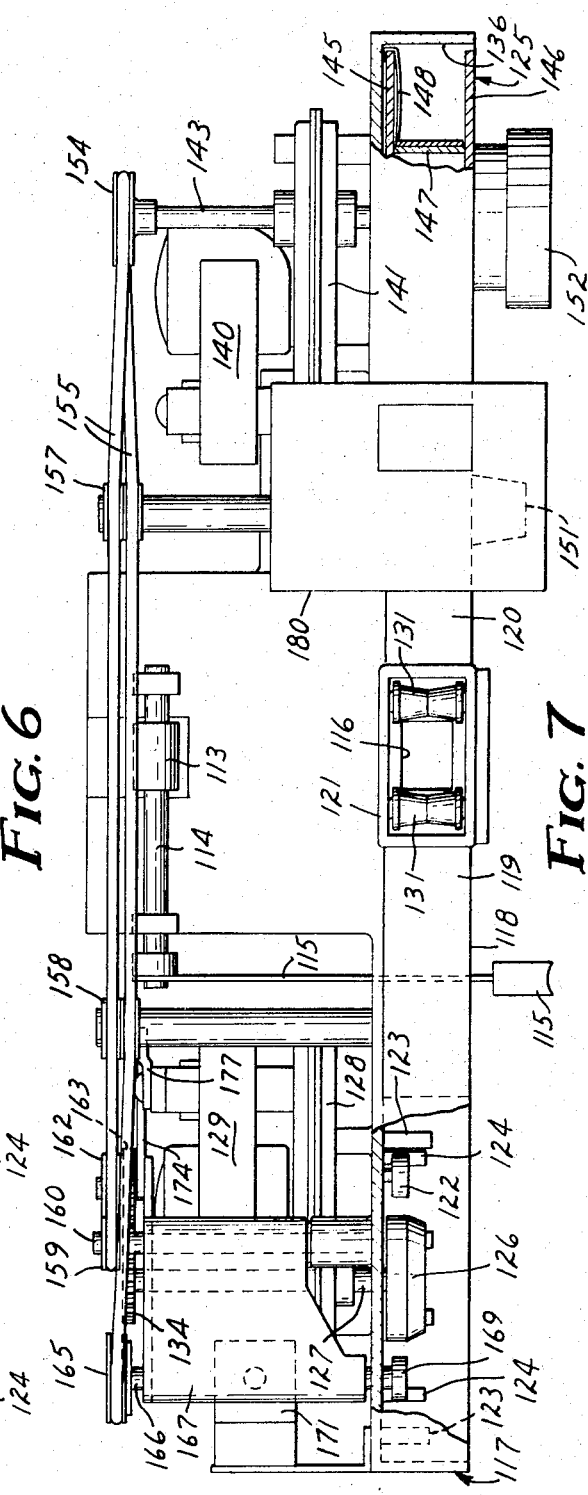
FIG. 7 is a top plan view of the web transport of FIG. 6.

Referring now to FIGS. 6, 7, and 8 of the drawing, there is shown a second embodiment for a web transport attachment formed according to the present invention which is also for use with a microfilm reader or reader-printer. The microfilm machine upon which this second embodiment would be used would utilize a projection lamp 109, a condensing lens 110, and a projection lens system in a lens barrel 111 to define a viewing station similar to that of the first embodiment. The image to be viewed would be placed in register with the station by a film gate or aperture 116 defined along the path of a film on a molded frame 117 of the attachment as illustrated in FIGS. 6 and 7.

On the front or outboard side of the frame 117 is molded a raised area 118 which together with guide members 119 and 120, a film positioning member 121, and two rollers 122 define a film path for directing a leader and/or a film between a supply of microfilm and a takeup reel 125. The positioning member 121 is formed with a portion of the aperture 116 which aligns with a portion of the aperture 116 on the frame 117 to provide a light path through the member 121 and a portion of microfilm to be projected.

Means are provided to accurately position the section of film to be projected with respect to the lens holder 111. The positioning member journals a pair of rollers 131 which are formed with spaced flanges and which are biased by springs (not shown) against a portion of the film path formed around the aforementioned aperture 116 so that microfilm will be held by its edges at a predetermined position within the positioning member 121 with respect to the generally uppermost edge of the member 121. The member 121 is biased by a leaf spring 132, which is also formed with a portion of the aperture 116, so that the uppermost edge of the positioning member 121 will be pressed into contact with the lens holder 111. Thus, the distance between the section of film to be projected and the lens in the lens holder 111 may be accurately maintained as an aid to focusing the image.

The web transport is supported on a microfilm reader or reader-printer by a plate which mates with a pair of guide rails 112 formed on the frame 117. Means are provided for positioning a desired portion of the film which is located in the positioning member 121 with respect to the lens barrel 111 in a direction parallel with the rails 112. A radial arm 113 is attached to a shaft 114 journaled on the frame 117. The free end of the arm 113 is properly formed to be received in a slot in the support plate on a printer or reader-printer so that manipulation of an adjustment arm 115 attached to the shaft 114 will rotate the shaft 114 and arm 113 thus changing the position of the end of the arm 113 in a direction parallel with the rails 112 and causing the transport attachment to move along the plate on which it is supported. Thus, the film disposed at the aperture 116 may be positioned as desired with respect to the lens barrel 115 in a direction normal to the direction of travel of the film through the positioning member 121.

As best illustrated in FIG. 1, the means provided on the frame 117 for receiving and supporting a supply of microfilm may accommodate the same tape cartridge 20 which is supported on the embodiment of FIG. 1. The position of a cartridge 20 when used in the embodiment shown in FIG. 6, however, is rotated 90 degrees from the position of a cartridge 20 used in the first embodiment as shown in FIG. 1. The cartridge receiving means on the frame 117 comprises a recessed area in the molded frame 117. A pair of spaced lugs 123 locate the cartridge 20 and fit into recesses in one edge of the cartridge 20. A pair of curved springs 124 are attached to the frame 117 and engage a recessed area on the lower edge of the cartridge 20 as it is inserted into the receiving means.

Means are provided for driving the leader 33 of the supply of microfilm 31 in the cartridge 20 between the guide members to the takeup reel 125. A wheel 169 may be rotated and moved into driving contact with the leader 33 wound on the periphery of the supply reel 32 by means later to be explained, thus propelling the leader 33 along the film path toward the takeup reel 125.

Means are provided for driving the rotatable reel 32 in the cartridge 20 in a direction which will wind the film 31 and/or leader 33 onto the rotatable reel 32 after they have been extended.

The cartridge 20 when positioned in the cartridge receiving means positions the hub of the rotatable supply reel 32 on a hub 126 of a driven shaft 127. The hub 126 has spring biased axially projecting pins which will be received in openings in the hub of the reel 32. The driven shaft 127 is the output shaft of a speed reducing mechanism or gear box 128 which may be driven in a counter clockwise direction as viewed in FIG. 6 by an electrical motor 129 supported from the gear box 128. The motor 129 has an axially movable rotor, drive shaft, and drive gear assembly 130 which will be disengaged or uncoupled from the gear train in the gear box 128 when the motor 129 is not activated. The entire assembly of the gear box 128 and the motor 129 is essentially identical to the gear box and motor assembly 37 as previously described and shown in FIGS. 4 and 5. As is best seen in FIG. 8, on the inboard end of the drive shaft 127 is attached the hub of a one-way overrunning clutch 139 which carries a spur gear 134. The clutch 139 and the spur gear 134 form a part of a drive transfer system which may be operated manually to wind the film and/or leader onto the reel 32 in a supply cartridge 20 used on the transport as will later be explained.

Means are provided to drive the takeup reel 125 in a clockwise direction as shown on FIG. 6 so that the leader 33 and/or the film 31 may be wound into the takeup reel 125. The reel 125 is attached to a driven shaft 143 of a gear box or speed reducing mechanism 141 which may be driven by a motor 140. The motor 140 and the gear box 141 correspond substantially to the motor 55 and gear box 56 of the embodiment previously described.

The takeup reel 125 comprises an inner flange 145 and axially spaced outer flange 146 connected by a hub 147 which is covered with a foam material such as a thin layer of polyurethane. Both flanges 145 and 146 fit in a cylindrical cavity 136 on the molded frame 117. The walls defining the cylindrical cavity 136 between the flanges thus serve as a guide to direct the film leader 33 between the reel flanges 145 and 146.

The reel 125 is provided with means for coupling the leader 33 to the reel 125 so that it will automatically be taken up and wound onto the reel 125 as the reel 125 is rotated when the roller 169 moves the leader 33 to the rotating reel 125. In this embodiment four axially extending spring members 148 are attached to the flange 145 of the reel 125. The spring members 148 are shaped to decrease the spacing between the flanges such that the springs will grasp the sides of the leader 33 and direct the same inwardly toward the hub 147. This will happen because the takeup reel 125 is driven at an angular velocity at which the linear velocity of any point on the takeup reel 125 exceeds the linear velocity of the leader 33 being pushed into contact with the takeup reel by the rotation of the wheel 169. Thus the leader 33 is moved into engagement with and wrapped on the foam-covered hub 147.

A switching means is provided to activate either the motor 140 to wind the leader 33 and film 31 onto the takeup reel 125 or to activate the motor 129 to wind the film 31 and leader 33 onto the reel 32 in the cartridge 20. A three position switch 150 is mounted on the frame 117 and is connected by appropriate wiring to the motors 140 and 129 so that from a central "off" position a control handle 151 on the switch may be moved upward to activate the motor 140, or downward to activate the motor 129 so that the film 31 may be positioned as desired on the transport.

The takeup reel 125 is also provided with means for permitting the manual application of rotational force thereto. The exterior surface of the flange 146 is provided with a projecting knob 152 which may be grasped by the operator and rotated either clockwise or counter clockwise to wind on or unwind film from the reel 125. The manual movement of the reel 125 in an unwinding direction requires that the film be rewound on the supply reel 32 and therefore a drive system between the shaft 127 and the shaft 143 is provided when neither of the motors 140 and 129 are activated to move the film between the reel 32 in the cartridge 20 and the takeup reel 125.

At the inboard end of the drive shaft 143 for the takeup reel 125 is fixed a pulley 154. A drive belt 155 of circular cross section is positioned around the pulley 154 and the drive belt 155 affords the torque transmission or drive system which may drive the spur gear 134 on the shaft 127 coupled to the supply reel 32. The belt 155 is guided over two pairs of idler pulleys 157 and 158, which are rotatably mounted on support posts. The belt 155 also extends around an idler pulley 159 rotatably mounted on a shaft 160, a pulley 162 attached to a spur gear 163 and a pulley 165 are rotatably mounted on a pivotable frame 167 which is mounted on and pivots around the shaft 160. The shaft 166 carries on its outboard side the drive roller 169 for driving the leader 33 off the flanges of the supply reel 32 and along the film path into engagement with the takeup reel 125 as previously described when motor 140 is energized.

The movable frame 167 is movable between a first and a second position. In the first position of the frame 167 the spur gear 163 is in driving contact with the spur gear 134. In the second position of the frame 167 the gears 163 and 134 are no longer in driving contact and the roller 169 may be in contact with the film leader 33 as previously described.

An electrical solenoid 171 with a spring returned plunger is provided to move the frame 167 between its first and its second position. When the solenoid 171 is not activated, its spring loaded plunger through an appropriate linkage will move the frame 167 to its first position, and when activated, the solenoid will urge the frame 167 toward its second position. The solenoid 171 is connected through an appropriate control system to be activated whenever either of the motors 140 or 129 are activated by manipulation of the control handle 151. Thus, when neither of the motors 129 or 140 is activated the frame 167 will be in its first position where the gears 163 and 134 are coupled to complete a drive system via drive belt 155 and clutch 139 which will transfer to the reel 32 torque applied at the knob 152 to wind film off of takeup reel 125 and onto the reel 32 in the cartridge 20. When under these circumstances torque is manually applied to the knob 152 in a direction suitable to wind film onto the takeup reel 125, however, the clutch 139 will not couple the gear 134 to the shaft 127 and driving torque will not be transferred to the reel 32.

It should be noted that when either the motor 129 or 140 is activated, the solenoid 171 will also be activated, and will move the frame 167 toward its second position to prevent driving contact between the reels 32 and 125 via the coupling system previously described. The gear reduction unit 128 or 141 attached to the undriven reel 125 or 32 will serve as a means of retarding the unwinding of film from the nondriven reel and will act as a brake to prevent spilling of the film 31 from the nondriven or supply reel when the driven reel 125 or 32 is stopped.

Means are also provided for allowing the roller 169 to move to a position relative to the cartridge 20 when it may be required to drive a leader off of the reel 32 and for preventing the wheel 169 from coming in contact with the leader 33 or reel 32 when the leader 33 is being wound on the periphery of the reel 32.

Pivotably attached to the lower end of the frame 167 by a pin 173 is an arm 174 (see FIG. 8). The arm 174 is formed with a cam like surface 175 which is positioned adjacent the side of the extended end of the shaft 130 on the motor 129 when the motor 129 is in a deactivated condition. One edge of the end of the arm 174 opposite the pin 173 rests against a stop member 177 which is fixed to the motor 129. A spring 178 attached between the stop member 177 and the arm 174 urges the edge of the arm 174 toward the stop member 177. When the motor 140 is activated to wind the film 31 and leader 33 upon the takeup reel 125 the solenoid 171 is also activated thus urging the frame 167 toward its second position. When the frame 167 moves toward its second position the cam surface 175 of the arm 174 will be moved into contact with the side of the extended shaft 130 of the deactivated motor 129 and thus the arm 174 will be moved in a direction away from the stop member 177 so that a notch 176 in the arm 174 will not engage the stop member 177. Thus, the frame 167 is allowed to move to its second position where the gears 134 and 163 are disengaged, and where the roller 169 driven by the motor 140 via the drive belt 155 may drive the leader 33 off of the periphery of the reel 32.

When the motor 129 is activated by proper positioning of the switch handle 151 to wind the film 31 and leader 33 onto the reel 32, the solenoid 171 is also activated to urge the frame 167 toward its second position. Because the motor 129 is activated, the shaft 130 is not in a position at which it can be contacted by the cam edge 175 of the arm 174. Thus, movement of the frame 167 toward the second position will be stopped when the notch 176 formed by the arm 174 comes in contact with the stop member 177. The notch 176 is positioned along the arm 174 to permit the solenoid 171 to move the frame 176 to a position at which the gears 163 and 134 are disengaged and at which the roller 169 will not be brought into contact with the leader 33 when it is wound on the periphery of the reel 32.

A counter 180 is supported on the frame 117. The counter 180 is driven from a spool 181 which is engageable with the film 31 along the film path. The spool 181 has stepped portions such that the wide leader 33 as it moves along the film path through the counter engages portions of the spool 181 having a greater diameter than those portions engaged by the film 31 as it moves across the spool 181. The stepped portions of the spool 181 which engage the leader 33 are not coupled to the counter drive as is the section of the spool 181 which contacts the film, thus the counter will only operate when the film 31 passes through it. A spool 184 mounted on the frame 117 is biased by a spring (not shown) against the spool 181 and is shaped to press the film 31 against the reduced portions of the spool 181 to drive the counter 180 by affording a frictional driving connection between the film 31 and the spool 181. The central portions of the spools 181 and 184 are recessed to avoid contact with the film 31 to prevent scratching of the imaged areas of the film 31. The counter 180 is equipped with a manual reset button 186 to return the number on the counter 180 to zero when desired. Mechanical linkage means are also provided to automatically reset the counter 180 to zero when the leader 33 passes into the counter 180 as it is being rewound onto the reel 32. The means are operated by a roller (not shown) which is moved in a direction parallel to the surface of the film 31 and normal to the direction of travel of the film 31 when the wider edge of the leader 33 moves through the counter 180. Thus, the counter 180 will automatically be reset to zero whenever the film 31 and leader 33 are rewound onto the cartridge 20.

OPERATION

To operate the transport shown in FIGS. 6, 7, and 8 a cartridge 20 is inserted into the receiving means to the position illustrated in FIG. 6. The control lever 151 of the manually operated switch 150 mounted on the frame 117 is moved upward by an operator from the normally "off" central position. With the control lever 151 in the upward position, the motor 140 through an appropriate switching system is activated to drive the takeup reel 125. The switching system will also activate the solenoid 171 to pivot the frame 167 around the shaft 160 toward the solenoid 171. As the motor 129 is not activated and as the shaft 130 is therefore extended from the gear box 128, the cam surface 175 of the arm 174 attached to the frame 167 will strike the shaft 130 to move the edge of the link 174 away from the stop 177 so that engagement of the notch 176 with the stop 177 will not occur. Thus, movable frame 167 can be moved to a position at which the gears 163 and 134 will disengage and the roller 169 will be moved into operable contact with the leader 33 contained in the cartridge 20. As the roller 169 is rotated by the motor 140 via the drive belt 155 it will drive the supply reel 32 in an unwinding direction to push the leader off the reel and out an opening in the cartridge. The leader will be directed between the guide members 119, 122, 118, 120 into driving contact with the driven takeup reel 125. As soon as the leader 33 has been driven off the periphery of the reel 20, the driving wheel 169 will no longer contact any portion of the film 31 or leader 33 and the fact that it continues to be driven during the advancing of the film 31 onto the takeup reel 125 is inconsequential.

When the counter 180 indicates that the frame number or film position desired by the operator has been reached the control lever 151 will be released by the operator and will return to the off position. When the control lever 151 is released, the motor 140 will be deenergized and its rotor will move the attached spur gear out of driving contact with the gears in the gear box 141. With the large angular momentum of the rotor of the motor 140 thus removed from the drive system, the frictional forces in the gear boxes coupled to the reels 125 and 32 will overcome the remaining momentum of the gears, the reels 125 and 32 and the film 31, and the movement of the film 31 will stop substantially immediately.

If it is desired to rewind a portion or all of the film 31 into the cartridge 20 the control handle 151 is moved in a downward direction to activate the motor 129 so that the reel 32 will be driven in a direction to wind the film 31 thereon. The solenoid 171 is activated with the motor 129, and urges the frame 167 to pivot around the shaft 160 toward the solenoid 171. As the shaft 130 is not extended from the motor 129 when the motor 129 is activated, the notch 176 in the arm 174 will catch on the stop 177 and the movement of the frame 167 will be limited at a point where the gears 163 and 134 are disengaged, but at which it will strike the leader 33 when it is wound upon the reel 32. When the desired rewinding is complete the control handle is again returned to its central of "off" position, the pinion attached to the rotor shaft 130 of the motor 129 disengages from the gear in the gear box 128, and the reels 125 and 32 stop substantially immediately.

If the operator desires to adjust the position of the film 31 with respect to the aperture 116 he may also do so manually by turning the knob 152 on the reel 125. If the operator wishes to wind the film 31 onto the reel 125 the one-way clutch 139 in the drive system between the reels 125 and 32 will slip so that torque between the reels 125 and 32 will only be transferred through the film 31. When the knob 152 is turned to wind film onto the reel 32, the one-way clutch 139 will connect the reels 152 and 32 through the drive train to turn the reel 32 with the reel 125 so that the film 31 will be moved toward the reel 32.

Having thus disclosed the present invention with reference to two embodiments, it will readily be understood that various modifications can be made in the structural details of the web transport and not depart from the spirit of the invention or scope of the appended claims.

I claim:

1. A web transport mechanism for moving a web past a predetermined station and for stopping said web to register portions of said web with said station, said transport comprising:

means defining a path for a said web;

a web drive shaft having means affording a driving connection with a said web to advance the same along said path;

drive means for rotating said web drive shaft for movement of said web along said path and for substantially instantly stopping said drive shaft, said drive means comprising:

a speed reducing mechanism connected to said web drive shaft, said speed reducing mechanism having at its input end a half of a drive coupling; and an electric motor having an axially movable motor drive shaft supporting a rotor and a half of a drive coupling, said motor drive shaft being movable upon energization of said motor from a first position where said halves of said drive coupling are separated to a second position where said halves of said drive coupling are coupled, and being movable from said second position to said first position of said drive shaft when said motor is deenergized; and means for energizing and deenergizing said motor to afford movement of said motor drive shaft to said second and back to said first position respectively to couple and separate said coupling halves.

2. A web transport mechanism according to claim 1 wherein said transport mechanism comprises:

hub means for supporting a web supply spool, said hub means being supported on a rotatable shaft and having means for frictionally retarding rotation of said shaft and hub means, and wherein said means affording a driving connection with a said web to advance the same comprises a web reel mounted upon said web drive shaft upon which web reel a said web may be wound.

3. A web transport mechanism according to claim 2 wherein a second drive motor having an axially movable drive shaft supporting a rotor and a half of a drive coupling is adapted to drive said hub means and wherein said means for frictionally retarding said rotatable shaft and hub means includes a speed reduction mechanism connected to said rotatable shaft, said speed reduction mechanism having a half of a drive coupling cooperating with said half of a drive coupling of said second drive motor when said second drive motor is energized.

4. A web transport mechanism according to claim 3 wherein a one-way belt drive means connects said web drive shaft and said rotatable shaft for rotational movement of said rotatable shaft in the same direction as said web drive shaft when said web drive shaft is moved in a web unwinding direction.

5. A web transport mechanism according to claim 1 including indicating means for indicating the position of a said web relative to a said station is operated in response to a web moving along said path.

6. An apparatus for rapidly transporting a web along a path between a web supply reel and a web takeup reel and past a station therebetween and for stopping a section of said web at said station, said apparatus comprising:
a frame;
first shaft means for supporting a supply reel on said frame;
second shaft means for supporting a takeup reel on said frame;
drive means for said first shaft means and for said second shaft means for rotating said shaft means to transport a said web therebetween and to provide essentially instant stopping of a desired section of said web at said station, said drive means comprising:
a multiple gear speed reduction mechanism operatively coupled to said second shaft means; and
a motor having an axially movable rotor shaft, which rotor shaft upon energizing of the motor will move into driving engagement with a gear of said speed reduction mechanism to drive said second shaft means; and
means for disengaging said rotor shaft from said speed reduction mechanism upon deenergizing said motor thereby removing the angular momentum of the rotor of the motor from the drive means, which removal of momentum allows the friction of said gear reduction mechanism to essentially instantly overcome the remaining momentum in the drive means, thus stopping further driving movement.

7. An apparatus according to claim 6 wherein a speed reduction mechanism is connected to said first shaft and a second motor is supported from said gear reduction mechanism connected to said first shaft, said second motor having an axially movable rotor shaft to afford engagement and disengagement with said speed reduction connected to said first shaft upon energization and deenergization of said second motor, respectively.

8. An apparatus according to claim 7 including one-way belt drive means for driving said first shaft means in the same direction as said second shaft means when said second shaft means is rotated in a direction opposite the direction of movement by said motor to unwind a said web from said takeup reel.

9. An apparatus according to claim 6 wherein said motor is a single phase induction motor and a spring is positioned about said rotor shaft to urge it away from said gear reduction unit when said motor is deenergized.

10. An apparatus according to claim 6 wherein said speed reduction mechanism comprises a plurality of spur gears in continuous engagement, one of which is connected to said second shaft means and a second of which spur gears is engageable with a spline gear on the rotor shaft of said motor.

11. An apparatus according to claim 8 including a wheel means movable into engagement with said web on said supply reel for driving said supply reel to propel said web from said supply reel into engagement with said takeup reel when said motor is energized, and means for moving said wheel means into contact with said web on said supply reel.

* * * * *

UNITED STATES PATENT OFFICE
CERTIFICATE OF CORRECTION

Patent No. 3,630,469     Dated December 28, 1971

Inventor(s) Thomas A. Turgeon

It is certified that error appears in the above-identified patent and that said Letters Patent are hereby corrected as shown below:

Column 6, line 46, change "1" to -- 6 --.

Column 8, line 5, after "165" insert -- attached to a shaft 166. The pulley 162 with its attached spur gear 163 and the shaft 166 supporting the pulley 165 --.

Column 10, line 23, after "which" insert -- the roller 169 will not move to a position at which --; and line 26, change "if" to -- or --.

Signed and sealed this 20th day of June 1972.

(SEAL)
Attest:

EDWARD M. FLETCHER, JR.
Attesting Officer

ROBERT GOTTSCHALK
Commissioner of Patents